United States Patent [19]
Kosaka et al.

[11] 3,762,294
[45] Oct. 2, 1973

[54] FOCUSING APPARATUS

[75] Inventors: Takeshi Kosaka, Sakai; Sanjiro Murakami, Kobe; Akio Yamanishi, Sakai, all of Japan

[73] Assignee: Minolta Camera Kabushiki Kaisha, Osaka, Japan

[22] Filed: Mar. 26, 1971

[21] Appl. No.: 128,455

[30] Foreign Application Priority Data
Mar. 26, 1970   Japan .............................. 45/25732

[52] U.S. Cl. .............................................. 95/44 C
[51] Int. Cl. ............................................. G03b 3/10
[58] Field of Search ...................... 95/44 R, 44 C; 250/204; 355/56, 61

[56] References Cited
UNITED STATES PATENTS

| | | | |
|---|---|---|---|
| 3,511,155 | 5/1970 | Yamada | 95/44 R |
| 3,274,913 | 9/1966 | Biedermann | 95/44 C |
| 3,336,851 | 8/1967 | Warshawsky | 355/56 X |
| 3,532,045 | 10/1970 | Ganahr | 355/56 X |
| 3,542,475 | 11/1970 | Cooper | 95/44 C X |
| 3,555,280 | 1/1971 | Richards | 95/44 R X |
| 3,562,785 | 2/1971 | Craks | 95/44 R X |
| 3,571,598 | 3/1971 | Lombard | 95/44 X |

Primary Examiner—John M. Horan
Attorney—Craig, Antonelli, Stewart & Hill

[57] ABSTRACT

A focusing apparatus for a photographic camera, projector and the like has a plurality of photoelectric elements, each of which has a substantially constant current characteristic, with respect to the impedance of its load, connected in series. A plurality of these elements are arranged in the image plane of an objective lens and connected across the series outputs thereof is a detector and electroservomechanism operatively linked to the optical system, for adjusting the focusing of the optical system so that the potential difference between each end of the photoelectric elements will be maintained at a minimum value.

10 Claims, 7 Drawing Figures

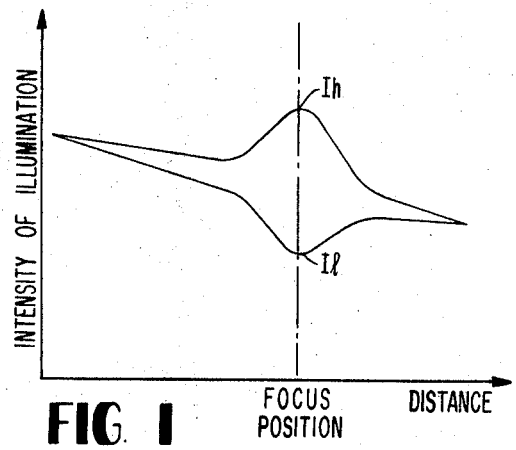
FIG. 1
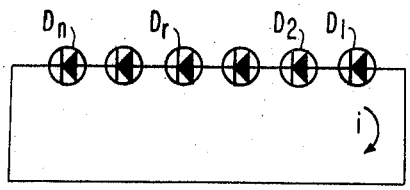
FIG. 2
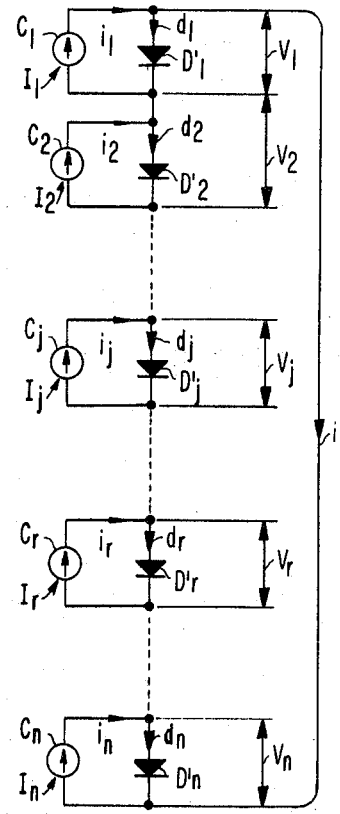
FIG. 3
FIG. 4
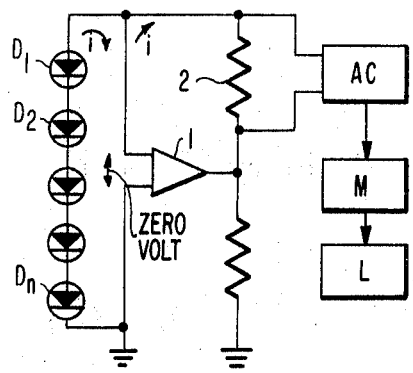
FIG. 5
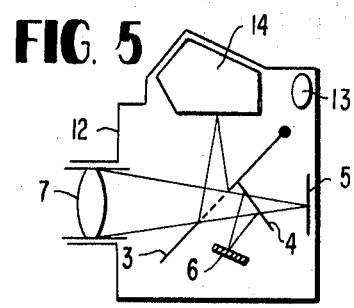
INVENTORS
TAKESHI KOSAKA
SANJIRO MURAKAMI
AKIO YAMANISHI
BY Craig, Antonelli, Stewart & Hill
ATTORNEYS

FOCUSING APPARATUS

BACKGROUND OF THE INVENTION

This invention relates to an improvement in focusing apparatus for an image forming system, for use in photographic cameras producing still pictures, motion pictures or television pictures, in picture projectors for slide film or motion picture film, or in photographic enlargers.

More particularly, this invention concerns an improvement in focusing apparatus for automatic detection of focusing in said cameras, projectors or enlargers, in which said apparatus comprises photoelectric and electronic control means.

For automatically focusing an objective lens, it is already known to utilize the phenomenon wherein the contrast of a real image exhibits maximum and minimum peaks of intensity when the lens is best focused, as disclosed, for instance, in the U.S. Pat. No. 3,274,913 (K. Biedermann et al). However, known focusing apparatus based on this phenomenon has not yet attained a sufficient reliability in practical use, since only one photosensitive element has been employed, and therefore only the mean value of intensity of illumination has been detected. Accordingly, the focusing is not detected with satisfactory accuracy by such conventional arrangements.

SUMMARY OF THE PRESENT INVENTION

It is, accordingly, a primary object of the present invention to provide an apparatus capable of detecting the best focus condition of a camera or the like with more reliability and sensitivy in comparision with the known art.

Focusing apparatus in accordance with the present invention is characterized by the series condition of photoelectric elements arranged in a focusing plane of an objective lens.

Further objects and advantages will be best understood from the following detailed description when read in conjunction with the accompanying drawings, in which FIG. 1 is a graph indicating the relationship between the relative focus position and intensity of illumination on an image plane;

FIG. 2 is a circuit diagram explaining the principle of the present invention;

FIG. 3 is a circuit diagram of an equivalent circuit for the circuit shown in FIG. 2;

FIG. 4 is a schematic diagram of an embodiment of the present invention;

FIG. 5 is a schematic representation of a sectional side view of a single-lens reflex camera embodying the present invention;

DETAILED DESCRIPTION OF THE INVENTION

Figure 6:
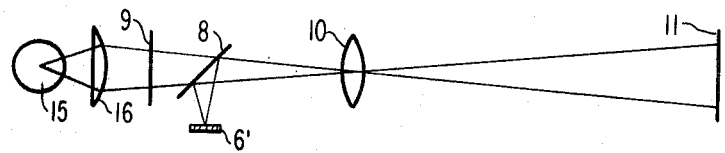
FIG. 6 is a schematic diagram of a projection of the present invention.

On an image plane of an image forming optical system, such as an objective lens, the illuminations on the part of the image having the highest illumination $I_h$ and the part of the image having the lowest illumination $I_l$, respectively, with respect to the distance from the principal plane of the lens to the image plane, are indicated by the characteristic shown in FIG. 1. In FIG. 1, the abscissa indicates the distance between the objective lens and the image plane and the ordinate indicates the intensities of illuminations on the image plane. As is indicated in FIG. 1, both the parts of the image having the highest illumination and the parts of the image having the lowest illumination show the maximum and minimum illumination, respectively, at the position of optimum focusing. In accordance with the present invention, such a focusing position, where the illumination of the latter part (lowest illumination part) becomes a minimum, is detected with an array or arrays of series-connected photoelectric elements, each having a constant-current characteristic, for instance, semiconductor photo-diodes, such as silicon solar batteries, i.e., silicon photovoltaic cells. Other photoelectric transducers which have constant-current characteristics, such as photo-transistors, also can be used as detecting elements.

Each of the photo-diodes has a constant-current characteristic when operating at a condition wherein the voltage across both terminals of the diode is very low, and each diode also has a linear characteristic wherein its output current is proportional to the energy of received input light.

In the event that several photo-diodes $D_1, D_2, \ldots D_n$ are connected in series and both ends of this series connected circuit are short-circuited to each other, as shown in FIG. 2, and the photo-diodes are arranged in an array in the correct image plane of the image forming optical system, such as an objective lens of an optical device, the output current $i$ flowing throughout the short-circuited series connection of photo-diodes becomes substantially equal to the smallest of output currents of the respective diodes; namely, the total current becomes equal to the current of the diode receiving the smallest light input energy.

The reason why the above-mentioned value of total current $i$ flowing is obtained is as follows:

The circuit of FIG. 2 can be represented by an equivalent circuit indicated in FIG. 3, where diodes in FIG. 2 are represented by parallel connections of ideal diodes $D'_1, \ldots, D'_j, \ldots, D'_n$ and ideal constant current sources $C_1, \ldots, C_j, \ldots, C_n$, respectively. Ideal constant current sources $C_1, \ldots, C_j, \ldots, C_n$ generate currents $i_1, \ldots, i_j, \ldots, i_n$ in response to intensities $I_1, \ldots, I_j, \ldots, I_n$ of lights incident on the photodiodes $D_1, \ldots, D_j, \ldots, D_n$, respectively, said currents being constant irrespective of the impedance of their respective loads. Defining the voltages produced across the diodes $D'_1, \ldots, D'_j, \ldots, D'_n$ as $V_1, \ldots, V_j, \ldots, V_n$, respectively, and the forward currents of the diodes as $d_1, \ldots, d_j, \ldots, d_n$, respectively, and providing that all the diodes have the same characteristics and the same amounts of reverse saturation currents represented by $i_s$, the following formulas are obtainable:

$$i_1 = k \cdot I_1$$
-
-
-
$$i_j = k \cdot I_j$$
-
-
-
$$i_n = k \cdot I_n \tag{1}$$
$$i = i_1 - d_1 = i_2 - d_2 = \ldots$$
$$= i_j - d_j = \ldots$$
$$= i_n - d_n \tag{2}$$

$$d_1 = i_s (e^{qV_1} - 1)$$

$$\cdot$$
$$\cdot$$
$$\cdot$$

$$d_j = i_s (e^{qV_j} - 1)$$

$$\cdot$$
$$\cdot$$
$$\cdot$$

$$d_n = i_s (e^{qV_n} - 1) \quad (3)$$

$$V_1 + V_2 + \ldots + V_n = 0 \quad (4)$$

where $k$ is a positive constant, $q$ is a positive constant common for all the diodes, and $e$ is the base for natural logarithms.

Providing that $$I_r < I_1 < I_2 < \ldots < I_n \quad (5)$$

from equations (1) and (5)

$$i_r < i_1 < i_2 < \ldots < i_n \quad (6)$$

From equations (2) and (6), $$d_r < d_1 < d_2 < \ldots < d_n \quad (7)$$

If a relation is assumed that $$d_r \geq 0 \quad (8)$$

from the equation (7), the following relation must exist:

$$0 \leq d_r < d_1 < \ldots < d_n \quad (9)$$

In order that $i_s > 0$ in equation (3), the following relationship is required:

$$0 \leq V_r < V_1 < \ldots < V_n \quad (10)$$

However, the requirement contradicts equation (4), and therefore, in contrast to the above-mentioned assumption (8) $d_r$ and $V_r$ must be negative. Accordingly, $$-i_s < d_r < 0 \text{ or } 0 < -d_r < i_s \quad (11)$$

Therefore, from equations (2) and (11) the output current $i$ becomes $$i_r < i < i_r + i_s \quad (12)$$

The reverse saturation voltage of the diode $i_s$ being in the order of $nA$ ($10^{-9}$ amperes), while $i$ is several hundred $nA$ for input light of several lux, the following relationship is obtained with errors as small as 1 percent even for input light levels over several lux:

$$i \approx i_r \quad (13)$$

That is to say, in a series-connection of photodiodes, as shown in FIG. 2, when both ends of the series-connected circuit are so connected as to have the same potential with each other, the current flowing through the series-connected diodes responds to the diode having the smallest light input among the light inputs to all the photodiodes. Therefore, by detecting that current, an intensity of illumination for the darkest element of a light receiving plane is obtainable.

The configuration of a practical embodiment of the present invention is shown in FIG. 4, wherein both ends of the series-connection of the photodiodes $D_1$, $D_2$, ..., $D_n$ are connected across respective input terminals of an operational amplifier consisting of a differential amplifier 1. Resistor 2 is connected between the output terminal and one input terminal of the differential amplifier 1 as a negative feedback resistor for the amplifier 1, in order to make the input voltage of the amplifier 1 zero. If the resistance of the resistor 2 is R, a voltage $i \cdot R$ is produced across the resistor 2 and is imparted as an input signal to the A.C. generator so that the generator A.C. generates an alternating current output responding to the input signal. The A.C. output drives a servomechanism, such as a servomotor M for adjusting the position of an objective lens of this apparatus.

The photodiodes are arranged in an image plane of the objective lens in order to receive focused light, i.e., the real image from the objective lens, with their light receiving surfaces.

One example of the present invention embodied in a single-lens reflex camera is shown in FIG. 5, wherein an eye-piece lens 13 serving as a view-finder, a view-finder prism 14, an objective lens 7, a photographic film 5 and a movable mirror 3 are contained in a camera box 12 to form a known camera of this type. The central part of the movable mirror 3 (shown by dotted line) is provided as a half-mirror, through which part a light beam converged by the objective lens penetrates, and is reflected by a second small mirror 4 and finally is focused on the array 6 of the photodiodes. A small hole may be used instead of the above-mentioned half mirror part. The array 6 is so positioned in the image plane as to receive a central part of the image which corresponds to, and is focused in coincidence with, the central part of the image to be focused, when the mirrors 3 and 4 are lifted up upon pressing of the shutter-releasing knob.

In order to obtain an automatic focusing signal, the array can be linked to a vibrating mechanism (not shown) which vibrates the array with a small stroke, for instance 0.1 mm, in a direction of the light beam striking the array. Due to such vibration, the intensity of illumination at the darkest element periodically changes in synchronism with the vibration of the array. As can be understood from FIG. 1, such change is minimized when the center of the vibration coincides with the exact focus position, namely, when darkest element is at the position represented by the minimum point of its illumination-position curve. Therefore, the generator A.C. receives an input signal until the array is positioned on the exact focused position. Thus, the servomotor M drives the objective lens L until at last the array is positioned on the exact focused position, thereby causing the image on the film to be exactly focused at its center part.

The array of the photodiodes may either be located in a line or be arranged in a plane. For practical usage of cameras, the central part of the image is generally controlled so as to be sharply focused, and therefore, it is recommended that the array be located in the central part. However, the location of the array of the photoelectric elements may be selected anywhere suitable for the purpose of the apparatus.

Instead of vibrating the array of photoelectric elements, a non-vibrating arrangement may be made by employing two arrays of photoelectric elements. In such an arrangement, elements of one array are located very close to those of the other array, respectively, but differ by a short distance, for instance 0.1 mm, in the direction of the light beam striking the array. By comparing the output signals of the above-mentioned two arrays, the focus position can be found by moving the objective lens in such a manner that both of said output signals become equal.

FIG. 6 illustrates another example of an image projector embodying the present invention. In FIG. 6, a half-mirror 8 is placed between the picture film 9 and the projecting lens 10. A return light beam from an image on the screen 11 is focused by the projecting lens 10, which works as an objective lens for this return light beam and then is reflected by the half-mirror 8. Finally, the return light beam strikes the photodiode array 6' forming a focused image thereon. A light source 15 and the light condenser lens 16 provide light to the picture film 9.

In the above-mentioned embodiment, by so selecting the position of the photodiode array 6' as to be in conjugate position with the position of the picture film 9, attainment of the sharp focus of the projected image on the screen 11 is possible by detecting the sharp focus of an image on the photodiode array.

Figure 7:
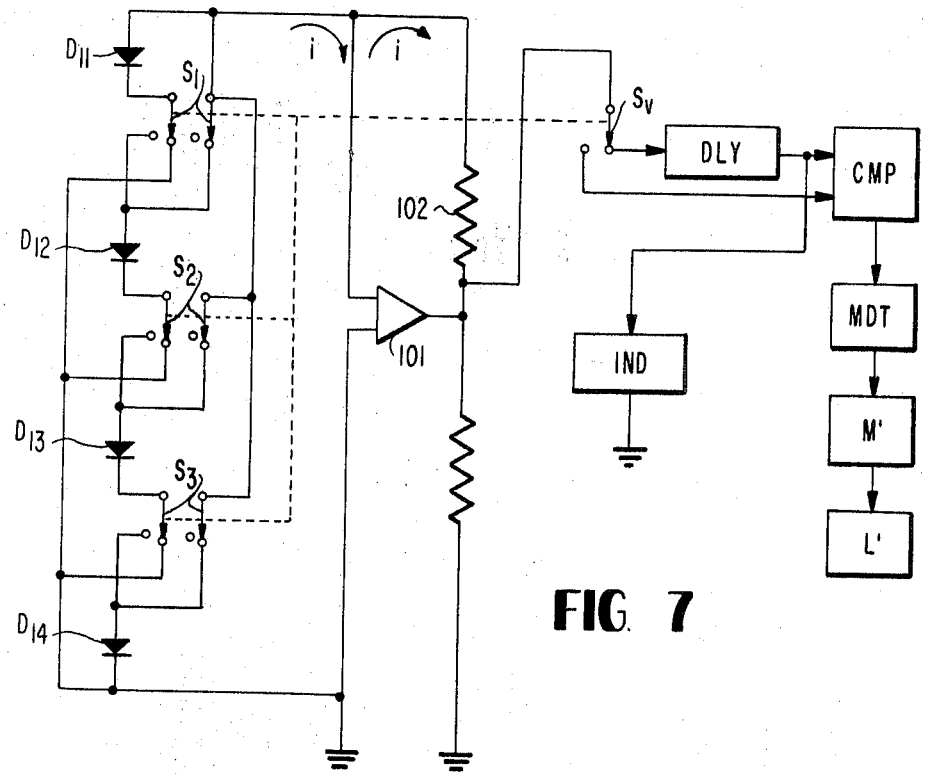
FIG. 7 is a schematic circuit diagram of another embodiment of the presentinvention.

FIG. 7 illustrates another example having interlocked change-over switches $S_1$ to $S_3$ in a circuit of photodiodes $D_{11}$ to $D_{14}$, and a switch $S_v$ in an output circuit of a differential amplifier 101. The switches $S_1$ to $S_3$ and $S_v$ are interlocked so as to alternatively and simultaneously change-over at a frequency far lower than the frequency of vibration of the photodiode array. Switches $S_1$ to $S_3$ and photodiodes $D_{11}$ to $D_{14}$ are so connected that at a throwing of the moving contacts of these switches to the left-side-contacts, respectively, all of the photodiodes $D_{11}$ to $D_{14}$ are connected in series to each other across input terminals of the differential amplifier 101, and at a throwing of the moving contacts to the right-side-contacts, respectively, all the photodiodes $D_{11}$ to $D_{14}$ are connected in parallel across the input terminal of the differential amplifier 101. A resistor 102 is connected between one input terminal and the output terminal of the amplifier 101 as a negative feedback resistor. Switch $S_v$ is so connected that at a throwing of a moving contact of the switch $S_v$ to a left-side-contact, the output signal of the amplifier 101 is applied to one input terminal of the comparison circuit CMP, and at a throwing of the moving contact to the right-side contact, the output signal of the amplifier 101 is applied to the delaying circuit DLY. The comparision circuit CMP compares output signals from the amplifier 101, during the series connection of the photo-diodes, with the output signals of the delaying circuit DLY, which represent output signals from the amplifier 101, during the parallel connection of the diodes. Therefore, the output of the comparison circuit applied to maximum value detector MDT conveys information on the difference between the (mathematical) mean value of the intensity of illumination and the lowest value of the intensity of illumination. By adjusting the lens L' with the servomechanism M', in such a manner that the difference becomes maximum, with employment of the maximum value detector, a sharp focusing is obtainable. Moreover, in the example of FIG. 7, the mean value of intensity of the illumination in the image can be indicated by an indicator IND connected to the output terminal of the delaying circuit DLY.

This invention can be applicable to a twin-lens reflex camera, and moreover, it can be also applicable to a camera other than a reflex camera if it is provided with an objective lens in its focusing apparatus. This invention can be applicable also to an optical apparatus comprising an image forming mirror as its image forming optical means.

While we have shown and described several embodiments in accordance with the present invention, it is understood that the same is not limted thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A focusing apparatus for an image forming optical system comprising:
   a plurality of series-connected photoelectric elements, each having a constant-current characteristic with respect to the impedance of its respective load arranged to receive by their light receiving faces parts of a real image formed by said optical system,
   an electric system for detecting output signals from said series connection of photoelectric elements under the condition that both ends of said series connection have essentially a zero potential difference therebetween; and
   means, responsive to the said output signals, detected by said electric system, for adjusting said optical system in a manner to maintain the current output of said series-connected elements at a minimum value.

2. A focusing apparatus as defined in claim 1, wherein said electric system comprises:
   an operational amplfier for detecting and amplifying output signals of said series-connected elements under said condition, and wherein
   said means for causing the current output of said series-connected elements to be at a minimum value comprises comprising an electric servomechanism operatively linked to said optical system, and operatively connected to said operational amplifier.

3. A focusing apparatus as defined in claim 2, wherein said image forming optical system is an objective lens of a photographic camera, and said photoelectric elements are arranged in the camera so as to receive parts of said real image which correspond to a real image to be projected on a photographic film in the camera.

4. A focusing apparatus as defined in claim 2, wherein said image forming optical system is a projection lens of a picture projector, said projector having a half-mirror in a light path of the apparatus so that a light beam reflected from the projected picture on a screen forms a real image on said light-receiving face of the elements.

5. A focusing apparatus for an image-forming optical system comprising:
   a group of photoelectric elements each having a constant-current characteristic with respect to the impedance of its respective load arranged to receive by their light receiving faces parts of a real image formed by said optical system,
   a switching network which alternatively changes the connection of said elements between a series connection and parallel connection,
   amplifier means for detecting and amplifying output signals from said connection of photoelectric elements,
   a comparator having two input terminals, a switch which repeatedly changes over in synchronism with said switching network so as to apply the output of said amplifier means to one input terminal of said comparator during series connection of said elements and to feed the output of said amplifier means to the other input terminal of said comparator during parallel connection of said elements, said comparator serving to compare the two outputs of said amplifier means corresponding respectively to said series connection and said parallel connection and to generate an output proportional to the difference between said two outputs, and an electric servomechanism operatively linked to said optical system, and operatively connected to the output terminal of said comparator in such a manner that the servomechanism stops upon detecting the maximum value of said output of the comparator.

6. A focusing apparatus as defined in claim 5, wherein said amplifier means is as operational amplifier.

7. A light measuring system for detecting a focusing condition at the focal plane of an image-forming optical system, said system comprising:

a plurality of photoelectric elements connected in series with one another, each of said photoelectric elements having a constant-current characteristic with respect to the impedance of a respective load therefor, arranged to receive, at their light receiving faces, portions of a real image formed by said optical system; and means for detecting output signals from said series connection of photoelectric elements under the condition that both ends of said series connection have essentially a zero potential difference therebetween, and wherein said means comprises an operational amplifier for detecting and amplifying the output signals of the photoelectric elements connected in series and means for causing the current output of the photoelectric elements to be at a minimum value.

8. A device according to claim 7, and further including an electric servomechanism operatively linked to said optical system and connected to said operational amplifier.

9. A device according to claim 8, wherein said image forming optical system comprises an objective lens of a photographic camera, and said photoelectric elements are arranged in the camera, so as to receive portions of a real image which correspond to a real image to be projected on a photographic film in the camera.

10. A device according to claim 8, wherein said image forming optical system comprises a projection lens of a picture projector, said projector having a half-mirror provided in a light path of the system, so that a light beam reflected from the projected picture on a screen forms a real image on the light receiving face of the photoelectric elements.

* * * * *